United States Patent Office 3,516,953
Patented June 23, 1970

3,516,953
GRANULAR, FREE-FLOWING, SYNTHETIC THERMOSETTING AMINOPLAST RESIN MOLDING COMPOSITION CONTAINING DEFIBERIZED ALPHA-CELLULOSIC PULP OF A CERTAIN FIBER LENGTH WHEREIN SAID FILLER IS SUBSTANTIALLY THE SOLE FILLER PRESENT
Ernest Herbert Wood, 2267 Shippan Ave., Stamford, Conn. 06902
No Drawing. Filed Mar. 25, 1968, Ser. No. 715,575
Int. Cl. C08g 51/18
U.S. Cl. 260—17.3                    6 Claims

ABSTRACT OF THE DISCLOSURE

A granular, free-flowing, synthetic thermosetting resin molding composition comprising an aminoplast thermosetting resin and a filler uniformly dispersed therethrough wherein said filler is a defiberized alpha-cellulosic pulp having a fiber length between about 1 and 6 mils and said fibers being substantially knot free and wherein said filler is substantially the sole filler present.

BACKGROUND OF THE INVENTION

Molding compositions prepared by using aminoplast molding compositions containing fillers have been marketed commercially for a plurality of years. These aminoplast resins are derived by reacting certain poly-functional amino compounds with an aldehyde to form a resin and it is then added to the desired amount of filler together with other conventional additives such as pigments, catalysts, mold lubricants, and the like. Among the poly-functional amino compounds conventionally used to make these molding compositions are urea, thiourea, dicyandiamide, the aminotriazines, melamine, formoguanamine, acetoguanamine, benzoguanamine, and the like. Although many aldehydes are available for reaction with these poly-functional amino compounds, for many reasons the aldehyde used is generally formaldehyde either as formalin or paraformaldehyde. Many modifications of these aminoplast molding compositions have been accomplished over the years in order to impart certain specific improved properties when the molding composition is to be used to make a molded article for some particular use or uses.

FIELD OF THE INVENTION

The present invention is in the field of synthetic thermosetting aminoplast resin granular, free-flowing, molding compositions containing a particular filler.

DESCRIPTION OF THE PRIOR ART

The most significant prior art of which the instant applicant is aware is represented by the U.S. Pats. 2,310,004 and 3,135,643.

SUMMARY OF THE INVENTION

This invention relates to a synthetic thermosetting molding composition having a filler uniformly dispersed therethrough wherein said filler is a defiberized alpha-cellulose pulp having fiber length between about 1 and 6 mils and wherein said fibers are substantially knot free and wherein said filler is substantially the sole filler present in the molding composition.

The ratio of the poly-functional amino compound to the aldehyde in making the thermosetting resin per se may be varied over conventional ranges, and since no novelty resides in such mol ratio, full description of these mol ratios is deemed to be unnecesary and redundant in view of the known prior art. It is deemed sufficient to say by way of illustration that if a urea-formaldehyde resin is selected, that said resin would be prepared by reacting urea and formaldehyde in ratios of 1:1 and 1:3; and preferably between about 1:1.25 and 1:2, urea to formaldehyde respectively. The triazine resin mol ratio would be comparable, but slightly greater mol ratios of formaldehyde can be tolerated with the triazines because of the greater functionality to be found therein.

The defiberized alpha-cellulose pulp used as the substantially sole filler in the molding compositions of the present invention should have a fiber length between about 1 and 6 mils, and preferably toward the lower limit of said range; namely, between about 1 and 3 mils. For certain purposes the fiber length is controlled between about 4 and 6 mils. The amount of filler in parts by weight in the composition based on the total weight of said filler and said aminoplast resin may be varied between about 20 and 50 parts filler and correspondingly between about 80 and 50 parts resin solids. It is preferred to use filler in amounts varying between about 30 and 40 parts by weight and correspondingly between about 70 and 60 parts by weight of the resin solids.

A substantial plurality of conventional catalysts, pigments, dyes and mold lubricants are commercially available and are conventionally used in conventional amounts, and further discussion of this aspect of the total composition is deemed to be unnecessary.

The alpha-cellulose pulp, conventionally received from manufacturers of the same, for use in molding compositions, comes in sheet form and before processing in conventional molding compositions said alpha-cellulose sheets are processed through a cutting machine which shreds the sheets into small pieces of alpha-cellulose paper. In order to achieve the particle size required in the composition of the present invention, the alpha-cellulose pieces of pulp can be converted readily to a defiberized alpha-cellulose pulp having fiber length between about 1 and 6 mils and substantially knot free by fine grinding of the little pieces in ball mills; or if desired, by cutting in a standard rotary knife cutter with a screen attachment of the desired size opening. In some cases, cooling by use of liquid nitrogen or seizing such as by using a small quantity of urea-formaldehyde resin will help to increase the efficiency of the size reduction to the level desired. The grinding or cutting is continued until all of the pulp is in the defiberized form and substantially free of knots prior to the blending of the other ingredients.

In order that the concept of the present invention may be more fully understood, the following examples are set forth in which all parts by weight unless otherwise indicated. These examples are set forth primarily for the purpose of illustration.

EXAMPLE 1

A urea-formaldehyde molding compound is prepared on differential rolls by compounding for two minutes on preheated rolls the basic composition set forth hereinbelow. The hot roll temperature is 180° F. and the "cold" roll is at 150° F. The feed to the rolls had the following composition:

|  | Parts by weight |
|---|---|
| Urea formaldehyde neat resin, $UF_{1.33}$ | 70 |
| Alpha-cellulose defiberized pulp | 30 |
| Tetrachlorophthalic anhydride catalyst | 0.28 |
| Hexamethylene tetramine | 0.26 |
| Zinc stearate | 0.4 |
| Titanium dioxide | 1.0 |

The above ingredients are added to the rolls as a preblended powder. The preblend is prepared in a twin shell blender for fifteen minutes. After the above preblended powder is introduced to the differential rolls, fifteen to thirty seconds are needed on the rolls before the material starts to flow and forms a continuous sheet on the rolls. The composition is milled further by continuously removing the fluxed sheet from the rolls and then reintroducing it at the nip of the rolls in the usual roll mill operation. The two-minute period on the differential rolls represents the total time elapsed from moment of placing the powder on the rollers to the final removal of the milled sheet. As the sheet is removed, it is cooled and granulated in a standard rotary knife cutter on a ⅛" screen. The defiberized pulp was used on three different runs, at three different fiber length ranges as determined microscopically; namely, 1–3 mils, 4–6 mils and 10–15 mils. These are, of course, average fiber lengths and in all cases the contents of the knots in the pulp was insignificant. The pulp at the 10–15 mil length was obtained by cutting through a screen using a rotary knife cutter. The other two fiber lengths were obtained by ball milling the 10–15 mil pulp for varying time intervals. After fluxing, it was apparent that the longer fibers contributed to a higher viscosity (i.e., a somewhat stiffer melt) on the rolls than the lower fiber lengths. Some of the properties of the molding composition and the molded articles derived therefrom are outlined hereinbelow.

TABLE I

| Sample designation | 1–A | 1–B | 1–C |
| --- | --- | --- | --- |
| Fiber length, mils | 1–3 | 4–6 | 10–15 |
| Tons to close in 15 seconds | 11 | 15 | 18 |
| Flow mold flow, inches | 0.023 | 0.030 | 0.036 |
| Granular density, g./cc | 0.68 | 0.64 | 0.54 |
| Ski-ball impact | 0.123 | 0.163 | 0.245 |
| Izod impact | 0.30 | 0.33 | 0.34 |
| Torque strength | 49 | 49 | 49 |
| Flexural strength, p.s.i | 14,200 | 12,600 | 12,900 |
| Flexural modulus, p.s.i | $1.07 \times 10^6$ | $1.08 \times 10^6$ | $1.08 \times 10^6$ |

It can be seen that the increase in the fiber length contributes to the stiffness of the molding compound as reflected by "tons to close" and flow-mold-flow. For the flow-mold-flow test, reference is made to the U.S. Pat. 2,639,277. The density is significantly increased by reducing the fiber length. The ski-ball impact is increased by raising the fiber length, but other mechanical properties do not seem to be affected significantly by fiber length. A further advantage of the present invention and one of the objects is to increase the ease of dispersion and increase the efficiency of compounding as reflected by the appearance of the molded articles under transmitted light. These properties are significantly enhanced by the use of the short fiber length, specifically 6 mils or lower. The appearance of the molded articles obtained with 6 mils fiber length is excellent and significantly superior to that obtained with the 10–15 mil fiber length. A further advantage of the present invention is in the field of processability in the use of equipment other than differential rolls. Compounding in a continuous extruder or intensive mixer is significantly more efficient with pulp below 5 mils in fiber length. Furthermore, the tendency of the material to flux and thus form the necessary resistance to shear is higher with the shorter fiber length of pulp. In each of the runs 1–A, 1–B and 1–C the same urea-formaldehyde neat resin was used and the pulp employed in all of those fiber lengths was from the same source.

EXAMPLE 2

A melamine-formaldehyde molding composition is prepared on differential rolls by the process similar to Example 1, except that both rolls were heated to 210° F. The feed to the rolls was of the following composition:

Parts by weight
Melamine formaldehyde molding resin, $MF_2$ -- 60 or 70
Alpha-cellulose defiberized pulp ---------- 40 or 30
Phthalic anhydride ------------------------ 0.28
Hexamethylene tetramine ------------------- 0.10
Zinc stearate ----------------------------- 0.40
Titanium dioxide -------------------------- 1.0

Before milling on the rolls the ingredients were blended on a twin shell blender for fifteen minutes with the addition of 1.0 part by weight of water, in the form of ice, for every 100 parts by weight of the total formulation. The defiberized pulp was used at the 30% level at three different ranges of fiber lengths; namely, 1–3 mils, 4–6 mils and 10–15 mils. At the end of two minutes the products of the first two fiber length formulas were very fluid on the roll. If these first two formulas were to be molded on a press, the plasticity of these compounds was so free as to render the obtaining of thick moldings with practical molding arrangements very difficult. The 10–15 mil pulp was more practical and exhibited plasticity comparable to that observed with conventional melamine-formaldehyde molding compositions. Thus for very large pieces the unexpected fluidity with very short fibers would enable molds to be filled that could not be filled with the longer fiber formulas. It is believed that the above behavior is attributable to the fact that the pulp at very small fiber length does not show as great resistance to the flow of the melted resin during processing and molding as the longer fibers do. As the fiber length is increased, the pulp contributes to the resistance of free flow. The longer fibers, on the other hand, contribute to the formation of stiffer molding compositions.

If one wished to increase the viscosity of the short fiber containing molding composition, one could accomplish such a result by prolonging the processing time on the differential rolls thus causing further advancement of the resin. Since some measure of cross-linking begins to develop as the resin is advanced, such increased advancement contributes to the stiffening of the molding compound. For certain purposes such an approach is undesirable since the balance of other properties is significantly controlled by the degree of the advancement of the resin. Therefore, some loss in the desirable characteristics of the molding compounds might result from causing too much advancement on the rolls.

A further advantage of the lower viscosity of the short fiber containing molding compositions is that it is practical to maintain both the short fiber length and the degree of resin advancement, but the stiffness of the molding composition can be increased by increasing the pulp content above 30% such as at 40% or even 50% for very stiff molding compositions. This is particularly advantageous in the case of melamine-formaldehyde resins since the cost of the pulp per unit weight is lower than the cost of the balance of the remaining ingredients of the molding composition. Thus, increasing the pulp content leads to savings in the total cost of the molding composition. This is achieved while maintaining the processing and appearance advantages which are associated with the short fiber length as outlined in Examples I–A and I–B. Two runs of Example 2 were accomplished; namely, II–A and II–B in which all factors were held constant except for the fiber length. In II–A, the fiber length averaged 4–6 mils; whereas in II–B, the fiber length varied over 10–15 mils. Typical data on the effect of pulp fiber length and pulp content on the properties of melamine-formaldehyde molding compositions and molded articles made therefrom are shown hereinbelow:

TABLE II

| Sample designation | II–A | II–B |
| --- | --- | --- |
| Fiber length, mils | 4–6 | 10–15 |
| Pulp content, percent | 40 | 30 |
| Tons to close, 19 seconds | 13 | 14 |
| Flow mold flow, inches | 0.027 | 0.024 |
| Granular density, g./cc | 0.64 | 0.55 |
| Ski-ball impact | 0.230 | 0.230 |
| Izod impact | 0.35 | 0.31 |
| Flexural strength, p.s.i | 11,600 | 11,100 |
| Flexural modulus, p.s.i | $1.16 \times 10^6$ | $1.13 \times 10^6$ |
| Taber abrasion, g./100 cycles | 0.060 | 0.070 |

Molded articles prepared from 11–A and 11–B showed good acid boil resistance, similar molded densities and good coffee staining resistance. It should be noted that the appearance under transmitted light (reflected dispersion) of sample II–A was superior to that of sample II–B.

What is claimed is:

1. A synthetic thermosetting resin granular, free-flowing, molding composition comprising an aminoplast thermosetting resin and a filler uniformly dispersed therethrough wherein said filler is a defiberized alpha-cellulosic pulp having a fiber length between about 1 and 6 mils and said fibers being substantially knot free and wherein said filler is substantially the sole filler present wherein the weight ratio of the filler to the resin solids is between about 20:80 and 50:50, respectively, said aminoplast resin being the reaction product of a poly-functional amino compound with an aldehyde.

2. The molding composition according to claim 1 in which the fiber length is between about 1 and 3 mils.

3. The molding composition according to claim 1 in which the fiber length is between about 4 and 6 mils.

4. A synthetic thermosetting resin molding composition according to claim 1 in which conventional amounts of a catalyst, a pigment and a mold lubricant are present.

5. A molding composition according to claim 1 in which the aminoplast resin is a urea-formaldehyde resin.

6. A molding composition according to claim 1 in which the aminoplast resin is a melamine-formaldehyde resin.

References Cited

UNITED STATES PATENTS

| 2,203,794 | 6/1940 | Meyer | 260—17.3 |
| 2,364,721 | 12/1944 | Kassay et al. | 260—9 |
| 2,467,160 | 2/1948 | Scott | 260—17.3 |
| 2,624,514 | 1/1953 | Wilhousky | 260—17.3 |
| 2,679,490 | 5/1954 | Meiser et al. | 260—17.3 |
| 2,507,465 | 5/1950 | Ayers | 260—17.3 |

FOREIGN PATENTS

| 1,017,363 | 3/1958 | Germany. |

WILLIAM H. SHORT, Primary Examiner

E. WOODBERRY, Assistant Examiner

U.S. Cl. X.R.

106—288

UNITED STATES PATENT OFFICE
CERTIFICATE OF CORRECTION

Patent No. 3,516,953          Dated   June 23, 1970

Inventor(s)   Ernest Herbert Wood

It is certified that error appears in the above-identified patent and that said Letters Patent are hereby corrected as shown below:

In the heading to the printed specification, lines 8 and 9, "Ernest Herbert Wood, 2267 Shippan Ave., Stamford, Conn. 06902" should read -- Ernest Herbert Wood, Stamford, Conn., assignor to American Cyanamid Company, Stamford, Conn., a corporation of Maine --. Column 2, line 42, "seizing" shoule read -- sizing --.

Signed and sealed this 3rd day of November 1970.

(SEAL)
Attest:

EDWARD M. FLETCHER, JR.          WILLIAM E. SCHUYLER, JR.
Attesting Officer                Commissioner of Patents